(12) United States Patent
Yamada et al.

(10) Patent No.: US 6,641,217 B2
(45) Date of Patent: Nov. 4, 2003

(54) SEAT RECLINER FOR VEHICLE

(75) Inventors: Yukifumi Yamada, Toyota (JP); Naoaki Hoshihara, Aichi-ken (JP); Hideo Nihonmatsu, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/912,309

(22) Filed: Jul. 26, 2001

(65) Prior Publication Data

US 2002/0024246 A1 Feb. 28, 2002

(30) Foreign Application Priority Data

Jul. 26, 2000 (JP) .......................................... 2000-225708

(51) Int. Cl.⁷ ................................................ B60N 2/10
(52) U.S. Cl. ........................ 297/367; 297/366; 297/368
(58) Field of Search ................................. 297/366, 367, 297/368, 369

(56) References Cited

U.S. PATENT DOCUMENTS

| | | | | |
|---|---|---|---|---|
| 2,784,770 A | * | 3/1957 | Herr ............................ 297/367 |
| 4,348,050 A | * | 9/1982 | Letournoux et al. ........ 297/365 |
| 5,154,476 A | * | 10/1992 | Haider et al. ............... 297/367 |
| 5,632,525 A | * | 5/1997 | Uramichi ..................... 297/367 |
| 6,007,153 A | * | 12/1999 | Benoit et al. .......... 297/378.12 |
| 6,024,410 A | * | 2/2000 | Yoshida ..................... 297/30.1 |
| 6,092,874 A | * | 7/2000 | Kojima et al. .............. 297/367 |
| 6,102,480 A | * | 8/2000 | Asano ......................... 297/366 |
| 6,328,382 B1 | * | 12/2001 | Yamashita ................... 297/367 |

FOREIGN PATENT DOCUMENTS

JP 9-234132 9/1997

* cited by examiner

*Primary Examiner*—Peter R. Brown
*Assistant Examiner*—Joe Edell
(74) *Attorney, Agent, or Firm*—Burns, Doane, Swecker & Mathis, LLP

(57) ABSTRACT

A seat recliner for a vehicle includes a lower arm adapted to be fixed to a seat cushion, an upper arm adapted to be fixed to a seat back and rotatably supported by the lower arm, a pawl slidably supported by the lower arm, an inner gear portion formed at the upper arm for engagement by the pawl, and a pressure member rotatably supported by the lower arm to urge the pawl into engagement with the inner gear portion. The back surface of the pawl includes a projecting portion for engaging the pressure member, and the pressure member includes a cam surface for engaging the projecting portion. First and second contact portions are formed on opposite sides of the cam surface for being contacted by the back surface of the pawl upon application of an excessive force to the upper arm which causes the pawl to be inclined.

14 Claims, 3 Drawing Sheets

SEAT RECLINER FOR VEHICLE

This application is based on and claims priority under 35 U.S.C. §119 with respect to Japanese Application No. 2000-225708 filed on Jul. 26, 2000, the entire content of which is incorporated herein by reference.

1. Field of Invention

The present invention is generally directed to vehicle seat. More particularly, the present invention pertains to a seat recliner for a vehicle that is capable of desirably adjusting and maintaining a tilted angle between the seat back and the seat cushion of a vehicle seat.

2. Background of the Invention

A known seat recliner for a vehicle is disclosed in a Japanese Patent Application published on Sep. 9, 1997 as Toku-Kai-Hei 9 (1997)-234132. This vehicle seat recliner has a lower arm fixed to a seat cushion, an upper arm fixed to a seat back and rotatably supported by the lower arm, a pawl slidably movable in the lower arm, an inner gear portion formed on the upper arm for engaging the pawl, and a pressure plate rotatably supported by the lower arm and urging the pawl into engagement with the inner gear portion.

The backside of the pawl is provided with a cam surface and a projecting portion on the pressure plate contacts the cam surface. The pressure plate further has a first contact portion and a second contact portion formed on both sides of the projecting portion.

The pawl is urged by engaging the cam surface with the projecting portion so that the pawl engages the inner gear portion of the upper arm. Then the engagement between the pawl and the inner gear portion regulates the upper arm not to rotate relative to the lower arm, thereby maintaining any desired tilted angle between the seat back and the seat cushion of the vehicle seat. When the pressure plate is rotated, the contact between the cam surface and the pressure plate is released, and the pawl is also slidably moved toward the pressure plate, whereby the engagement between the pawl and the inner gear portion is released. Then, the rotation of the upper arm relative to the lower arm is permitted so that the tilt angle between the seat back and the seat cushion can be adjusted. The first contact portion or the second contact portion of the pressure plate is designed to contact the back side of the pawl only when the upper arm is given an excessive load while the upper arm is regulated not to rotate relative to the lower arm.

The contact with the backside of the pawl prevents the pawl from inclining relative to the lower arm and so undesired disengagement of the pawl from the inner gear portion is prevented. However, due to small gaps between the contact portions of the pressure plate and the backside of the pawl, a slight incline of the pawl inevitably occurs till the pawl backside touches on the first contact portion or the second contact portion. The inclination of the pawl to one direction causes an increase of the pressure angle of the cam surface against the projection of the pressure plate because the cam surface is formed on the pawl for urging the pawl. This increase of the pressure angle causes the pushing force applied to the pawl to be decreased. The possibility of undesirable disengagement of the pawl from the inner gear portion thus still remains.

To restrict the inclination of the pawl and prevent an increase of the pressure angle of the cam, tight contact of the backside of the pawl with the first and second contact portions might have some effect. However, to achieve such tight contact, a relatively highly precise formation of the backside of the pawl and each of the first and second contact portions is necessary. This precise formation undesirably decreases the productivity. Also, such tight engagement of the backside of the pawl with the first and second contact portions can have adverse effects in other regards such as with respect to operation feeling.

Accordingly, a need exists for an improved seat recliner for a vehicle that is not as susceptible to the disadvantages and drawbacks discussed above.

It would be desirable to provide a seat recliner for a vehicle which can relatively reliably prevent disengagement between the pawl and the inner gear portion formed in the upper arm.

SUMMARY OF THE INVENTION

In accordance with one aspect of the invention, a seat recliner for a vehicle includes a lower arm adapted to be fixed with respect to a seat cushion, an upper arm adapted to be fixed with respect to a seat back and rotatably supported by the lower arm, an inner gear portion formed at the upper arm, a pawl slidably supported by the lower arm and engageable with the inner gear portion, a pressure member rotatably supported by the lower arm to urge the pawl into engagement with the inner gear portion, a projecting portion formed on a back surface of the pawl for engagement with the pressure member, a cam surface formed on the pressure member for engagement with the projecting portion, a first contact portion formed on one side of the cam surface of the pressure member for contacting the back surface of the pawl, and a second contact portion formed on an opposite side of the cam surface of the pressure member for contacting the back surface of the pawl.

Thus, the seat recliner is designed so that the cam surface is formed on the pressure member, and the first and second contact portions are formed on the pressure member. When the upper arm receives an excessive load, inclination of the pawl is restricted to an extent defined by the gap between the first contact portion or the second contact portion and the cam surface of the pressure member. Although a slight inclination of the pawl occurs, this inclination does not increase the pressure angle of the cam surface, thus preventing undesirable disengagement between the pawl and the inner gear portion of the upper arm. Additionally, by virtue of the gaps between the backside of the pawl and each of the first and second contact portions, precise forming of the various parts is not needed, thus increasing the productivity and facilitating the manufacture of the seat recliner.

In accordance with another aspect of the invention, a seat recliner for a vehicle includes a lower arm adapted to be fixed with respect to a seat cushion, a shaft supported for rotation on the lower arm, an upper arm adapted to be fixed with respect to a seat back and rotatably supported on the shaft for rotation relative to the lower arm, an inner gear portion formed at the upper arm, a pawl supported by the lower arm and slidably movable into engagement with the inner gear portion to restrict rotation of the upper arm relative to the lower arm and out of engagement with the inner gear portion to permit rotation of the upper arm relative to the lower arm, the pawl including a back side from which extends a projecting portion, and a cam supported on the shaft for rotation together with the shaft about a rotational axis. The cam has a cam surface positioned in opposing relation to the projecting portion of the pawl to engage the projecting portion and urge the pawl into engagement with the inner gear portion. A projecting contact surface is provided on the cam, is positioned on one side of the cam surface and is spaced from the cam surface for being contacted by a back surface of the pawl when the pawl is inclined during application of a load to the upper arm.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
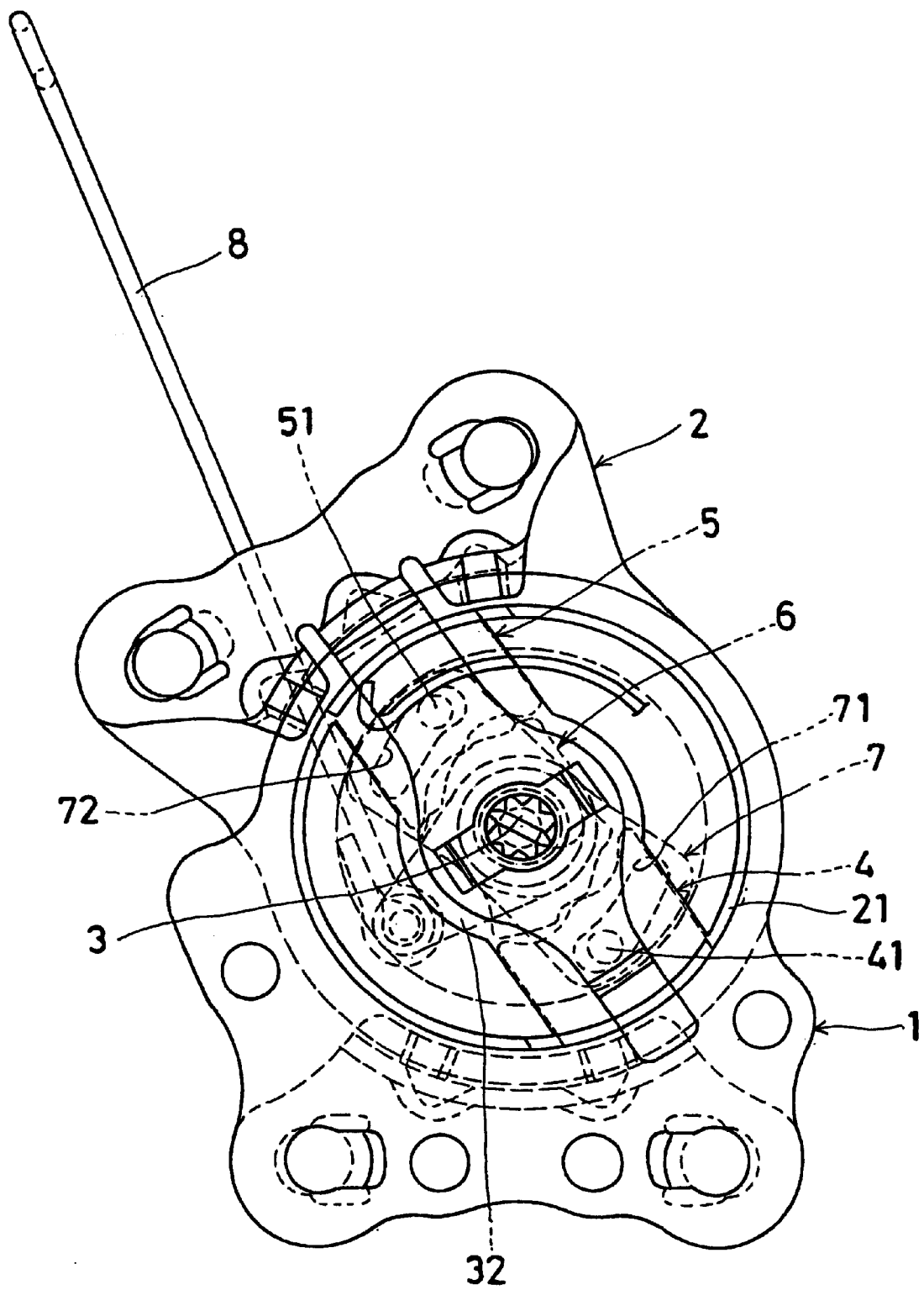
FIG. 1 is a side view of a seat recliner for a vehicle of the present invention.
Figure 2:
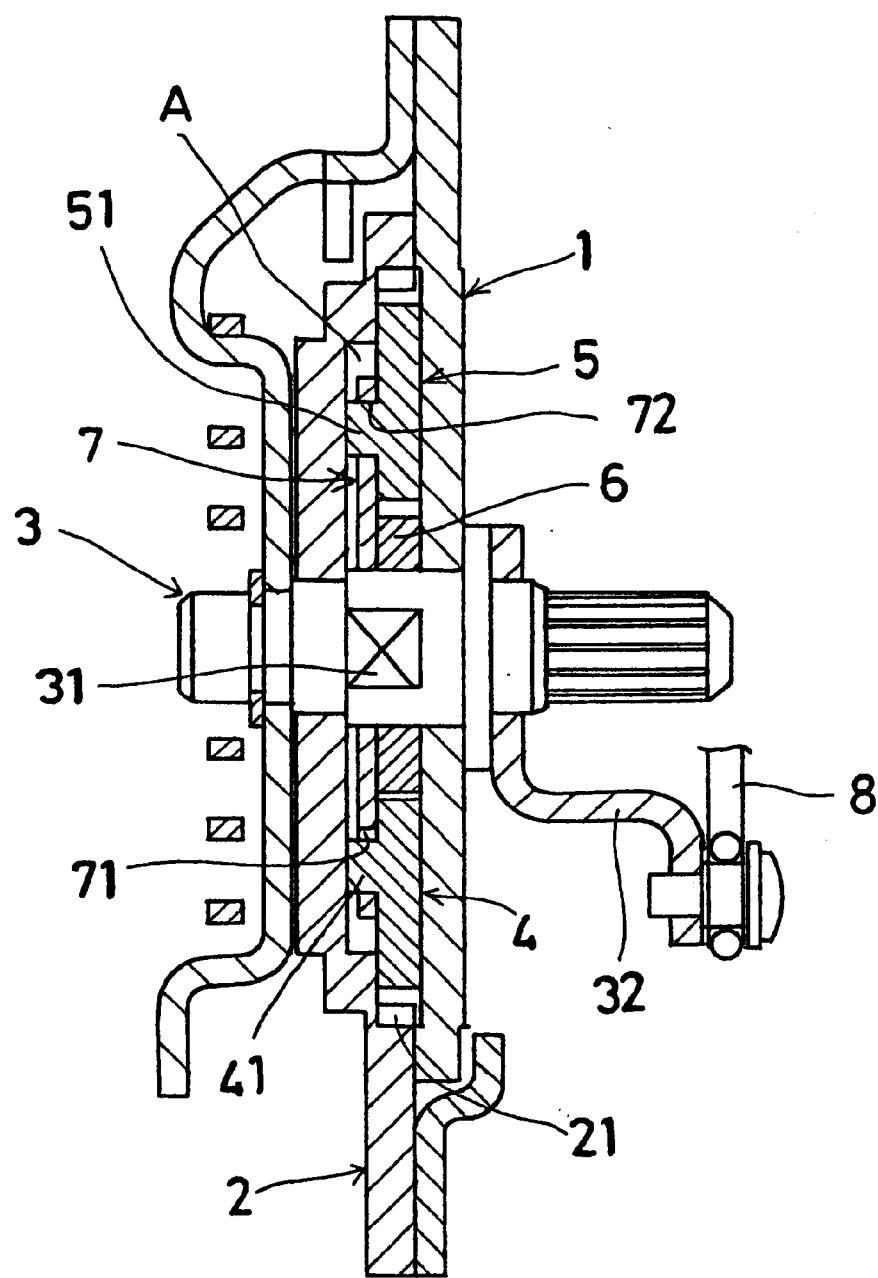
FIG. 2 is a vertical cross-sectional view of the seat recliner shown in FIG. 1.

The seat recliner of the present invention is adapted to be used in conjunction with a vehicle seat that includes a seat cushion and a seat back. Referring initially to FIG. 1, the seat recliner includes a lower arm 1 that is adapted to be fixed to the seat cushion and an upper arm 2 that is adapted to be fixed to the seat back. The lower arm 1 and the upper arm 2 overlap one another in their thickness direction (i.e., in the lateral direction in FIG. 2) as shown in FIG. 1 and FIG. 2. The upper arm 2 is rotatably supported by the lower arm 1.

The lower arm 1 and the upper arm 2 have half-blanked portions produced by stamping to form a recessed region in each of the arms 1, 2. The half-blanked portions forming the recessed regions face each other so that a space a is defined between the lower arm 1 and the upper arm 2 as shown in FIG. 2.

A shaft 3 is rotatably supported by the lower arm 1 and extends across the space A and through an opening in the upper arm 2. The upper arm 2 is rotatably movable relative to the lower arm 1 around the shaft 3.

Figure 3:
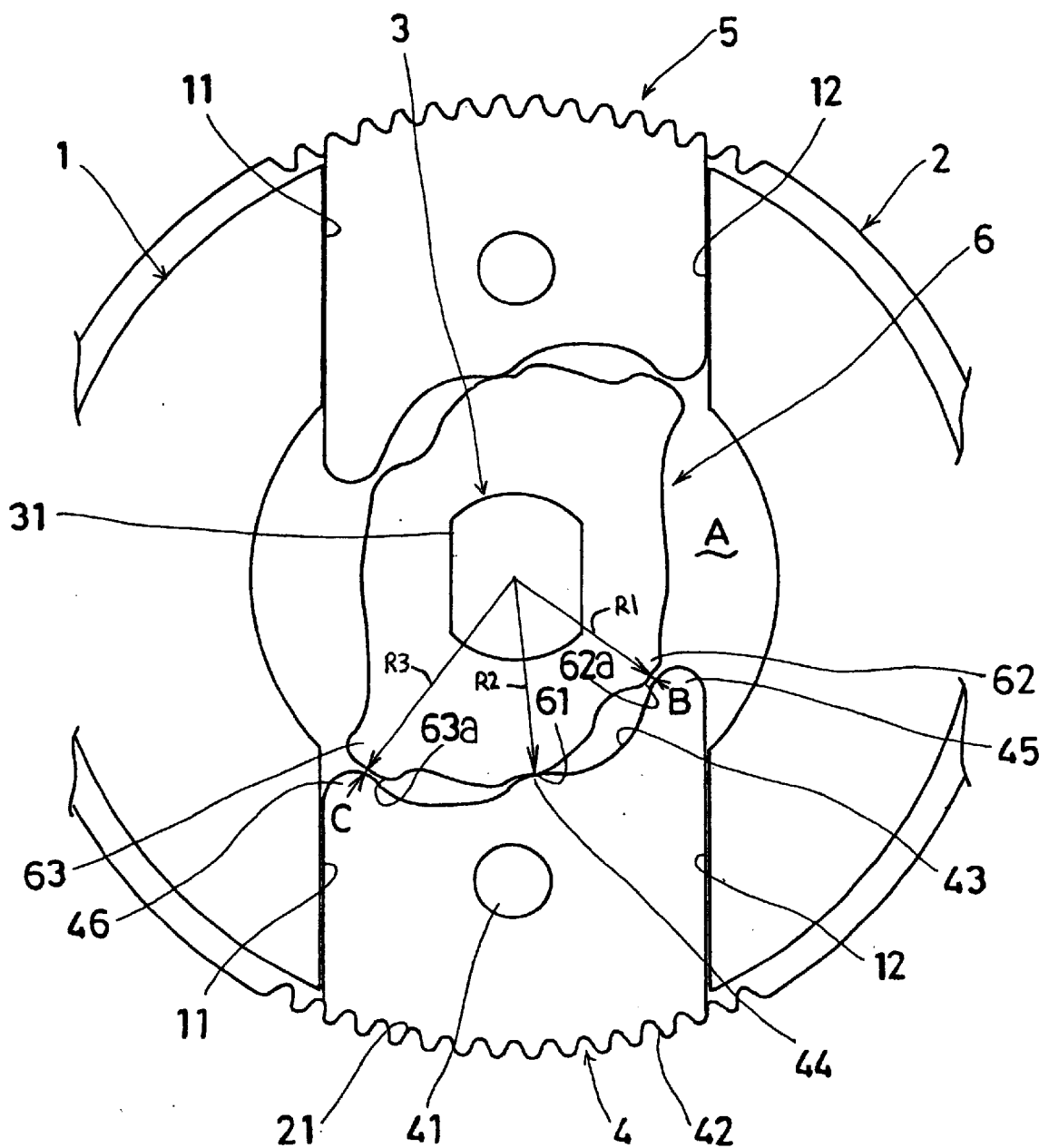
FIG. 3 is an enlarged side view of a portion of the seat recliner shown in FIG. 1.

As shown in FIG. 3, the lower arm 1 is provided with two pairs of guide surfaces 11, 12 that are formed on the half-blanked portions adjacent to or in the space A. One pair of guide surfaces 11, 12 face each other and are spaced apart by a predetermined clearance. Similarly, the other pair of guide surfaces 11, 12 face each other, are spaced apart by a predetermined clearance. The one pair of guide surfaces 11, 12 is located diametrically opposite from the other pair of guide surfaces 11, 12 as shown in FIG. 3. The guide surfaces 11, 12 of each pair extend in the radial direction of the lower arm 1 toward the shaft 3.

The upper arm 2 is provided with inner gear portions 21 adjacent to or in the space A, with each inner gear portion 21 being sector-shaped around the shaft 3.

A pair of pawls 4, 5 is provided in the space A as shown in FIG. 3. A predetermined clearance exists between each of the pawls 4, 5 and the guide surface 11 and the guide surface 12, respectively. Thus each of the pawls 4, 5 is slidably movable between both the guide surface 11 and the guide surface 12.

A cam 6 forming a pressure member is also positioned in the space A at a position between the pawls 4, 5 and is supported by flat parallel surfaces 31 formed on the outer peripheral surface of the shaft 3 as shown in FIG. 2 so that the cam 6 rotates together with the shaft 3.

An operating plate 7 is also disposed in the space A. The operating plate 7 is also supported by the flat parallel surfaces 31 on the shaft 3 in the same manner as the cam 6. The operating plate 7 has a pair of elongated holes 71, 72 that possess a somewhat bent shape as shown in FIG. 1 so that the holes 71, 72 are hooked in the radial direction. The outer side surface of the pawl 4 is provided with an axially extending projecting portion 41 that is positioned in one of the holes 71 while the outer side surface of the other pawl 5 is provided with an axially extending projecting portion 51 that is positioned in the other hole 72.

The various details and features associated with the one pawl 4 are the same as the features and details associated with the other pawl 5, and the interaction between the cam 6 and the two pawls 4, 5 is the same. Thus, it is to be understood that the description below relating to the pawl 4 and the interaction of the cam 6 with the pawl 4 also applies to the other pawl 5 and the interaction of the cam 6 with the other pawl 5. Further, the description below regarding the shape or configuration and the characteristics of the portion of the cam 6 (i.e., the lower portion of the cam 6 as seen with reference to FIG. 3) that engages the one pawl 4 applies equally to the portion of the cam 6 (i.e., the upper portion of the cam 6 as seen with reference to FIG. 3) that engages the other pawl 5.

The outer peripheral surface of the pawl 4 is provided with a gear portion 42 as shown in FIG. 3. The gear portion 42 is generally sector-shaped and is adapted to engage the inwardly directed inner gear portion 21 formed on the upper arm 2.

The pawl 4 further has a back surface or rear surface 43 at a side opposite the gear portion 42. A projecting portion 44 extending towards the cam 6 is formed on the back surface 43 at approximately the center of the back surface 43 in the width-wise direction (i.e., approximately at the central portion of the back surface 43 in the lateral direction in FIG. 3).

The outer periphery of the cam 6 is provided with a cam surface 61 that is engageable with the projecting portion 44. The projecting portion 44 possesses a smaller radius than the radius of the cam surface 61. In addition, a first projecting portion 62 (forming a first contact portion) and a second projecting portion 63 (forming a second contact portion) are positioned on opposite sides of the cam surface 61 of the cam 6. Thus, the cam surface 61 is positioned between and spaced apart from the first projecting portion 62 and the second projecting portion 63. The first projecting portion 62 possesses a contact surface 62a and the second projecting portion 63 possesses a contact surface 63a.

The back surface 43 of the pawl 4 is provided with a pair of extensions 45, 46. One extension 45 is positioned in generally opposing relation to the first projecting portion 62, with a gap B being defined between the portion of the back surface 43 that faces the first projecting portion 62 and the contact surface 62a. The other extension 46 is positioned in generally opposing relation to the second projecting portion 63, with a gap C being defined between the portion of the back surface 43 that faces the second projecting portion 63 and the contact surface 63a.

When the cam surface 61 of the cam 6 engages the projecting portion 44 of the pawl 4 upon rotation of the cam 6, the cam surface 61 pushes the pawl 4 to urge the gear portion 42 of the pawl 4 into engagement with the inner gear portion 21 of the upper arm 2.

The cam surface 61 has a pressure angle for the cam 6 so as not to be rotated by the sliding movement of the pawl 4 when the gear portion 42 of the pawl 4 engages the inner gear portion 21 of the upper arm 2. That is, the cam surface 61 forms a pressure angle for preventing the cam 6 from rotating by the sliding movement of the pawl 4.

The contact surface 62a, the cam surface 61, and the contact surface 63a are arranged in that order in the rotating direction of the pawl 6. These three surfaces 62a, 61, 63a are positioned at successively further distances or radii from the rotational axis of the cam 6 or shaft 3. Thus, as shown in FIG. 3, the contact surface 62a is at a distance or radius R1 from the rotational axis, the cam surface 61 is at a distance or radius of R2 from the rotational axis, and the contact surface 63a is at a distance or radius R3 from the rotational axis. The relationship between the distances or radii of the three surfaces 62a, 61, 63a is as follows.

R1<R2<R3

The operation of the seat reclining device, including the interaction between the pawl 4 and the cam 6 is as follows. It is to be understood that the interaction between the pawl 5 and the cam 6 is similar to the interaction between the pawl 4 and the cam 6 by virtue of the similarity in structure mentioned above.

When the upper arm 2 is not rotated relative to the lower arm 1 as shown in FIG. 1 and FIG. 3, the pawl 4 is urged in the direction which causes the gear portion 42 of the pawl 4 to engage the inner gear portion 21 of the upper arm 2 through engagement or contact of the projecting portion 44 of the back surface 43 of the pawl 4 with the cam surface 61 of the cam 6. Thus sliding movement of the pawl 4 is restricted and the engagement between the gear portion 42 and the inner gear portion 21 is maintained. In addition, the first and second projecting portions 62, 63 are located so that the contact surfaces 62a, 63a face the extensions 45, 46, respectively.

As shown in FIG. 1, a cable 8 is connected to a lever 32 that is fixed to the shaft 3. The shaft 3 can thus be rotated through application of a force to the cable 8. When the shaft 3 is rotated in one direction through operation of the cable 8, the cam 6 is rotated in the clockwise direction in FIG. 3 for releasing the engagement between the projecting portion 44 of the pawl 4 and the cam surface 61 of the cam 6. The pawl 4 is thus able to move or slide between the guide surfaces 11, 12 of the lower arm 1. Through rotation of the shaft 3 in the one direction, the operating plate 7 also rotates in the clockwise direction in FIG. 1 in the same manner as the cam 6. The pawl 4 is thus slidably moved toward the shaft 3 (i.e., radially inwardly in a direction away from the inner gear portion 21) through the engagement between the hole 71 and the projecting portion 41 of the pawl 4. As a result, the engagement between the gear portion 42 of the pawl 4 and the inner gear portion 21 of the upper arm 2 is released. With this operation, the upper arm 2 becomes rotatable relative to the lower arm 1.

In addition, as described above, the radius R1 of the contact surface 62a, the radius R2 of the cam surface 61, and the radius R3 of the contact surface 63a are arranged at successively increasing distances or radii from the rotational axis of the shaft 3 and the cam 6 (i.e., R1<R2<R3) so that the rotation of the cam 6 in the clockwise direction for releasing the engagement between the cam surface 61 and the projecting portion 44 is permitted without interference between the first projecting portion 62 and the extension 45 and without interference between the second projecting portion 63 and the extension 46.

When the upper arm 2 shown in FIG. 1 and FIG. 3 receives an excessive load to be rotated relative to the lower arm 1, the excess load applied to the upper arm 2 is transmitted from the inner gear portion 21 of the upper arm 2 to the gear portion 42 of the pawl 4. The load forces the pawl 4 to be inclined around the position wherein the cam surface 61 engages the projecting portion 41. The inclination of the pawl 4 occurs by virtue of a gap being defined between the guide surface 11, 12 and the pawl 4, or through deformation of the guide surfaces 11, 12. When this inclination of the pawl 4 occurs, the extension 45, 46 contacts the respective facing projecting portion 62, 63 of the cam 6 and thus regulates the pawl 4 so as not to rotate. Thus, the engagement between the gear portion 42 of the pawl 4 and the inner gear portion 21 of the upper arm 2 is maintained. As the cam surface 61 is formed on the cam 6, the inclination of the pawl 4 does not cause a change in the pressure angle of the cam 6. A decrease of the urging force on the pawl 4 is thus prevented and the engagement between the gear portion 42 of the pawl 4 and the inner gear portion 21 of the upper arm 2 is reliably maintained. Also, by designing the cam 6 and the pawl 4 so that gaps exist between the backside of the pawl 4 (i.e., the extension 45, 46 of the pawl) and the first and second contact portions 62a, 63a, precise formation of various parts of the seat recliner is not necessary. It is thus possible to realize improvements in the manufacturing ease as well as increased productivity.

The described and illustrated embodiment of the vehicle seat recliner includes a pair of pawls 4, 5. However, it is to understood that the invention is equally applicable to a vehicle seat recliner having one pawl or more than two pawls.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat recliner for a vehicle comprising:

a lower arm adapted to be fixed with respect to a seat cushion;

an upper arm adapted to be fixed with respect to a seat back and rotatably supported by the lower arm;

an inner gear portion formed at the upper arm;

a pawl slidably supported by the lower arm and engageable with the inner gear portion;

a pressure member rotatably supported by the lower arm to urge the pawl into engagement with the inner gear portion;

a projecting portion formed on a back surface of the pawl for engagement with the pressure member;

a cam surface formed on the pressure member for engagement with the projecting portion;

a first contact portion formed on one side of the cam surface of the pressure member for contacting the back surface of the pawl, with a gap defined between the back surface of the pawl and the first contact portion in the absence of a load over a predetermined level being applied to the upper arm; and a second contact portion formed on an opposite side of the cam surface of the pressure member for contacting the back surface of the pawl, with a gap defined between the back surface of the pawl and the second contact portion in the absence of a load over a predetermined level being applied to the upper arm.

2. The seat recliner for a vehicle according to claim 1, wherein the distance from a rotational center of the pressure member to the first contact portion is less than the distance from the rotational center of the pressure member to the cam surface, and the distance from the rotational center of the pressure member to the cam surface is less than the distance from the rotational center of the pressure member to the second contact portion.

3. The seat recliner for a vehicle according to claim 1, including an operating plate rotatably mounted on the lower arm and rotatable together with the pressure member, the operating plate including an elongated hole, the pawl including a projecting portion positioned in the hole in the operating plate.

4. The seat recliner for a vehicle according to claim 3, including a shaft supported on the lower arm, the pressure member and the operating lever being mounted on the shaft for rotation together with the shaft.

5. The seat recliner for a vehicle according to claim 1, including a shaft supported on the lower arm, the pressure member being mounted on the shaft for rotation together with the shaft.

6. The seat recliner for a vehicle according to claim 5, including a lever fixed to the shaft and an operating cable connected to the lever for operating the lever to rotate the shaft.

7. The seat recliner for a vehicle according to claim 1, inducting a plurality of pawls slidably supported by the lower arm and engageable with the inner gear portion, the back surface of each pawl being provided with a projecting portion for engagement with the pressure member, a plurality of cam surfaces on the pressure member equal in number to the number of pawls, each cam surface being engageable with the projecting portion of a respective pawl, a first contact portion formed on one side of each cam surface for contacting the back surface of one of the pawls, and a second contact portion formed on an opposite side of each cam surface for contacting the back surface of one of the pawls.

8. A seat recliner for a vehicle comprising:
    a lower arm adapted to be fixed with respect to a seat cushion;
    a shaft supported for rotation on the lower arm;
    an upper arm adapted to be fixed with respect to a seat back and rotatably supported on the shaft for rotation relative to the lower arm;
    an inner gear portion formed at the upper arm;
    a pawl supported by the lower arm and slidably movable into engagement with the inner gear portion to restrict rotation of the upper arm relative to the lower arm and out of engagement with the inner gear portion to permit rotation of the upper arm relative to the lower arm, the pawl including a back side from which extends a projecting portion;
    a cam supported on the shaft for rotation together with the shaft about a rotational axis, the cam including a cam surface positioned in opposing relation to the projecting portion of the pawl to engage the projecting portion and urge the pawl into engagement with the inner gear portion;
    a first projecting contact surface provided on the cam, the first projecting contact surface being positioned on one side of the cam surface and being spaced from the cam surface for being contacted by a back surface of the pawl when the pawl is inclined during application of a load to the upper arm, with a gap being defined between the back surface of the pawl and the first projecting contact surface in the absence of the load being applied to the upper arm; and a
    second projecting contact surface provided on the cam, the second projecting contact surface being positioned on an opposite side of the cam surface and being spaced from the cam surface for being contacted by a back surface of the pawl when the pawl is inclined during application of a load to the upper arm, with a gap being defined between the back surface of the pawl and the second projecting contact surface in the absence of the load being applied to the upper arm.

9. The seat recliner for a vehicle according to claim 8, wherein the distance from the rotational center of the cam to the projecting contact surface is less than the distance from the rotational center of the cam to the cam surface.

10. The seat recliner for a vehicle according to claim 8, wherein the distance from the rotational center of the cam to the projecting contact surface is greater than the distance from the rotational center of the cam to the cam surface.

11. The seat recliner for a vehicle according to claim 8, including an operating plate mounted on the shaft for rotation together with the shaft, the operating plate including an elongated hole, the pawl including a projecting portion positioned in the hole in the operating plate.

12. The seat recliner for a vehicle according to claim 8, including a lever fixed to the shaft and an operating cable connected to the lever for operating the lever to rotate the shaft.

13. The seat recliner for a vehicle according to claim 8, including an extension on the back side of the pawl that contacts the projecting contact surface of the cam when the pawl is inclined during application of a load to the upper arm.

14. The seat recliner for a vehicle according to claim 8, including a plurality of pawls supported by the lower arm, each pawl being slidably movable into engagement with the inner gear portion to restrict rotation of the upper arm relative to the lower arm and out of engagement with the inner gear portion to permit rotation of the upper arm relative to the lower arm, a projecting portion extending from the back side of each of said plurality of pawls, the cam including a plurality of cam surfaces equal in number to the number of pawls, each cam surface being positioned in opposing relation to the projecting portion of one of the pawls to engage the projecting portion and urge the pawl into engagement with the inner gear portion, a plurality of projecting contact surfaces provided on the cam, each projecting contact surface being positioned on one side of a respective one of the cam surfaces and being spaced from the respective cam surface for being contacted by the back surface of a respective one of the pawls when the respective pawl is inclined during application of a load to the upper arm.

\* \* \* \* \*